(12) United States Patent
Baxter et al.

(10) Patent No.: US 12,169,739 B2
(45) Date of Patent: Dec. 17, 2024

(54) COMPUTER SYSTEM EXECUTION ENVIRONMENT BUILDER TOOL

(71) Applicant: T-Mobile Innovations LLC, Overland Park, KS (US)

(72) Inventors: Scott R. Baxter, Leonard, TX (US); Christopher J. Chandler, Allen, TX (US); Gyani Pillala, Frisco, TX (US)

(73) Assignee: T-Mobile Innovations LLC, Overland Park, KS (US)

(\*) Notice: Subject to any disclaimer, the term of this patent is extended or adjusted under 35 U.S.C. 154(b) by 407 days.

(21) Appl. No.: 17/684,362

(22) Filed: Mar. 1, 2022

(65) Prior Publication Data

US 2023/0281054 A1 Sep. 7, 2023

(51) Int. Cl.
*G06F 9/50* (2006.01)
*G06F 9/445* (2018.01)

(52) U.S. Cl.
CPC .......... *G06F 9/505* (2013.01); *G06F 9/44526* (2013.01); *G06F 9/5044* (2013.01)

(58) Field of Classification Search
CPC ...................................................... G06F 9/505
See application file for complete search history.

(56) References Cited

U.S. PATENT DOCUMENTS

2014/0250187 A1\* 9/2014 Musfeldt ................. H04L 67/04
709/204

\* cited by examiner

*Primary Examiner* — Charlie Sun

(57) ABSTRACT

A method of automatically setting up a computer system execution environment based on declarative statements about environment requirements input by a user. The method comprises analyzing a manifest file by a decision engine application executing on a computer system to identify computer system environment requirements; determining available computer system resources by the decision engine application; defining by the decision engine application a computer system execution environment that meets the computer system environment requirements identified in the manifest file; invoking at least one pluggable interaction component executing on the computer system by the decision engine based on the computer system execution environment defined by the decision engine application; and setting-up by the at least one pluggable interaction component at least some of the computer system execution environment defined by the decision engine application.

20 Claims, 4 Drawing Sheets

COMPUTER SYSTEM EXECUTION ENVIRONMENT BUILDER TOOL

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Software may be used to refer to a variety of instructions that can be executed by semiconductor processors. Software can include computer programs, computer code, computer scripts, firmware, and other expressions of machine executable logic. Almost all modern appliances have software executing in them: cell phones, personal computers, host computers, engine controllers in vehicles, airplane flight control systems, residential and commercial HVAC systems, communication systems, etc. Software in complex systems such as communication systems, air traffic control systems, inventory management systems can be extremely complicated. Automated tools and systems to assist in managing and controlling the configuration of software have been developed, but much of the activity of developing software remains a manual activity performed by software engineers, computer programmers, and coders. Often a team of software developers collaborate together in creating large, complex software systems.

SUMMARY

In an embodiment, a system for setting up computer system execution environments based on declarative statements about environment requirements input by a user is disclosed. The system comprises an at least one processor, a non-transitory memory; a manifest parser application stored in the non-transitory memory that, when executed by the at least one processor, receives an environment manifest comprising declarative statements about computer system execution environment requirements and validates the environment manifest. The system further comprises a decision engine application stored in the non-transitory memory that, when executed by the at least one processor, analyzes the environment manifest to determine what environment capabilities are identified, determines available computer system resources, based on the analysis of the environment manifest and on the determination of available computer system resources, defines a computer system execution environment that meets the requirements identified in the manifest and can be supported by the available computer system resources, and invokes one or more pluggable interaction components to set-up the defined computer system execution environment. The system further comprises a plurality of pluggable interaction components stored in the non-transitory memory that, when executed by the at least one processor, act upon requests from the decision engine application to build the computer system execution environment, whereby users are able to set-up the computer system execution environment without defining low level details of the computer system execution environment.

In another embodiment, a method of automatically setting up a computer system execution environment based on declarative statements about environment requirements input by a user is disclosed. The method comprises receiving a manifest file identifying computer system execution environment requirements by a manifest parser application executing on a computer system, wherein the manifest file is created based on declarative statements input by a user, validating the manifest file by the manifest parser application, in response to determining that the manifest file is valid, sending the manifest file by the manifest parser application to a decision engine application executing on the computer system, and analyzing the manifest file by the decision engine application to identify computer system environment requirements comprising at least one item selected from the group consisting of a database requirement, a payment card industry (PCI) data handling requirement, a logging requirement, an execution platform type requirement, a personal identity information (PII) data handling requirement, a load balancer requirement, a georedundancy requirement, and a number of availability zones (AZs) requirement. The method further comprises determining available computer system resources by the decision engine application, based on analyzing the manifest file and based on available computer system resources, defining by the decision engine application a computer system execution environment that meets the computer system environment requirements identified in the manifest file, and invoking at least one pluggable interaction component executing on the computer system by the decision engine based on the computer system execution environment defined by the decision engine application. The method further comprises setting-up by the at least one pluggable interaction component at least some of the computer system execution environment defined by the decision engine application, sending information on the set-up computer system execution environment by the at least one pluggable interaction component to the decision engine application, sending information on the set-up computer system execution environment by the decision engine application to a computer system inventory management application executing on the computer system, and providing access to the set-up computer system execution environment by the computer system inventory management application to users based on logical names of computer system resources in the computer system execution environment, whereby the computer system resources can be decommissioned and taken out of service and replaced by other computer system resources by the decision engine application and the computer system inventory management application transparently to the users.

In yet another embodiment, a method of automatically setting up a computer system execution environment based on declarative statements about environment requirements input by a user is disclosed. The method comprises receiving a manifest file identifying computer system execution environment requirements by a manifest parser application executing on a computer system, wherein the manifest file is created based on declarative statements input by a user, analyzing the manifest file by a decision engine application executing on the computer system to identify computer system environment requirements comprising at least one item selected from the group consisting of a database requirement, a payment card industry (PCI) data handling requirement, a logging requirement, an execution platform type requirement, a personal identity information (PII) data handling requirement, a load balancer requirement, a geo-redundancy requirement, and a number of availability zones (AZs) requirement, and defining by the decision engine application a computer system execution environment that meets the computer system environment requirements identified in the manifest file. The method further comprises invoking at least one pluggable interaction component that executes on the computer system by the decision engine based on the computer system execution environment defined by the decision engine application, setting-up by the at least one pluggable interaction component at least some of the computer system execution environment defined by the decision engine application, sending information on the set-up computer system execution environment by the at least one pluggable interaction component to a computer system inventory management application executing on the computer system, and providing access to the set-up computer system execution environment by the computer system inventory management application to users. The method further comprises determining that at least some resources of the set-up computer system execution environment are scheduled to be taken out of service, determining available computer system resources by the decision engine application, and defining by the decision engine application a second computer system execution environment that meet the computer system environment requirements identified in the manifest file based on the available computer system resources and excluding the resources scheduled to be taken out of service. The method further comprises invoking at least one pluggable interaction component executing on the computer system by the decision engine based on the second computer system execution environment defined by the decision engine application, setting-up by the at least one pluggable interaction component at least some of the second computer system execution environment defined by the decision engine application, sending information on the second set-up computer system execution environment by the at least one pluggable interaction component to the computer system inventory management application, and providing access to the second set-up computer system execution environment by to users.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
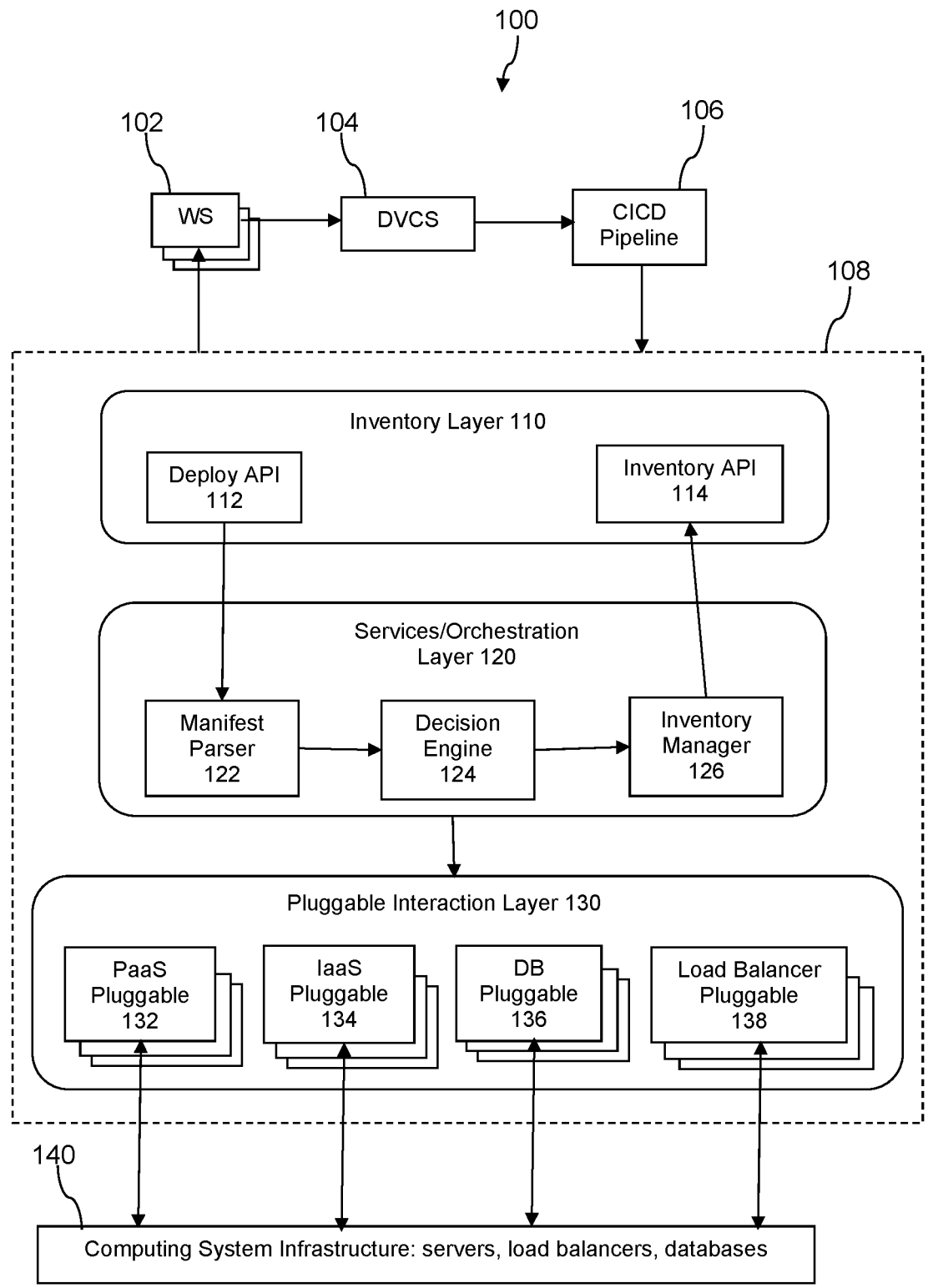
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Setting up computer system execution environments is a complicated, skills-intensive activity. Such execution environments are set-up not just when deploying finished applications and software but during the development phase, integration phase, testing phase, as well as at the deployment phase. In some cases, a lead software developer may make poor choices in setting up their execution environments because their expertise is not crafting such environments but instead is designing and developing computer applications. In these cases, the execution environments may not be crafted to be sufficiently robust and this can lead to failures and problems. In other cases, the lead software developer may specify an over-built execution environment—using unnecessarily robust or hardened resources, thereby entailing unnecessary expense. Additionally, sometimes lead software developers will unknowingly diverge from a preferred model that an enterprise is favoring, whereby to achieve cross-project commonality and/or to migrate to a new definition of enterprise promoted best practice.

The present disclosure teaches methods and systems for automatically building and/or setting-up computer system execution environments easily, based on declarative statements about the needed environment input by a user, for example input by a lead software developer, a lead software architect, by a software project team leader, or by another responsible person. The builder system takes the declarative statements, for example formatted by a user interface into a standard formatted file such as a YAML file, parses these declarative statements, determines available computer resources, and builds a computer system execution environment, using some of the computer resources identified as being available, that conforms to the declarative statements input by the user. This may involve the builder system automatically setting-up databases that accord with one or more declarative statements about database needs of the execution environment contemplated by the user, without defining precisely the database system or tool to be used. The builder system makes those decisions and establishes suitable access permissions and handles to interact with the subject set-up database. This may involve the builder system automatically setting-up load balancers to distribute transactions or processing among execution hosts. This may involve the builder system automatically setting-up georedundancy for the execution hosts. The builder system can also automatically set-up other features of an execution environment such as providing message handling and/or message queueing, payment card industry (PCI) compliant payment handling functionality, personally identifiable information (PII) data handling functionality, security handling functionality, automatic processing scaling functionality, and more. The builder system is a technical solution to the technical problem of building execution environments and provides the benefits of convenience and avoiding setting-up computing environments wrongly. The builder system also provides a vehicle for establishing consistent execution environments across an enterprise and for propagating enterprise standards for execution environments.

The builder system can set up (1) a development execution environment in which the developer/developer team can draft their code, build their code, and informally test their code; (2) a test execution environment in which test teams can test the application; and (3) a production execution environment that is carrying live traffic and/or may be customer facing. The builder system can decide where resources and application artifacts ought to be located—based on inputs from users and based on inferences made by the builder system based on other information the builder system has access to, such as currently available processing resources, memory resources, data store resources, load balancer resources, or based on a security tier associated with an application based on a table that links the asset identity of the subject application to a project defined tier or mission criticality designation. The builder system can provide support for security credentials in a way that is transparent to users but implements security procedures from the very start of a project. During transitions of a project from a first project phase or environment to a second project phase of environment, the builder system improves computer efficiency by reducing processing in the desired execution environment (because the "right sized" environment is configured) and also reduces errors in setting-up the desired execution environment. This efficiency gain is increased further by the builder system setting-up more consistently available, more consistently versioned, and more consistently configured execution environment components and architectures than otherwise would be the case if software developers followed their own spirits and impulses.

The builder system can seamlessly migrate a project environment from a development execution environment to a test execution environment, from a test execution environment to a production execution environment, and/or between other execution environments. Said in other words, the builder system can take a first manifest file associated with a project and set-up a development execution environment for the project based on that first manifest file. The builder system can later take a second manifest file associated with the same project and set-up a test execution environment for the project based on the second manifest file, reusing and extending at least some of the resources that were set-up for the development execution environment. The builder system can later take a third manifest file associated with the same project and set-up a production execution environment for the project based on the third manifest file, reusing and extending at least some of the resources that were set-up for the test execution environment. More generally, the builder system can update an execution environment based on a new manifest file associated with a same project and establish the execution environment implied by the new manifest file using at least some of the resources previously established for the project. This provides both efficiency of computer use by the builder (that is, the builder system does not have to re-invent the wheel—or re-invent the execution environment—it simply elaborates or extends) and efficiency in usage of computer resources by the desired execution environment.

The builder system automatically establishes needful communication links and/or references among different elements of the computer system execution environment it set-up, without the user/developer having to manually establish these links and references. As a result, the builder system is able to automatically adapt and change these links and/or references as things in the execution environment changes (e.g., as old servers are decommissioned and new servers are added). The builder system provides logical names and/or links to users (e.g., developers who will use the set-up execution environment to develop, integrate, test, and deploy applications and systems) which the users rely upon to access the set-up execution environment. As the underling execution environment changes, the builder system automatically migrates resources from decommissioned resources to new resources and adapts the logical names and/or links to refer to the new resources, thereby migrating compute resources transparently to users. In conventional systems such migrations would entail extensive efforts on the part of developers to rework configuration files and/or development software to use the new resources. These logical names and/or links can apply to communication pathways among collaborating applications belonging to the same end-system or software product. This use of automatic migration as the underlying execution environment changes (e.g., some servers decommissioned and other servers brought into service) and use of logical communication path names improves computer efficiency in that fewer errors occur and less computer processing is needed. This also creates more consistently available, consistently versioned, and consistently configured components and architectures.

Turning now to FIG. 1, a system 100 is described. In an embodiment, the system 100 comprises one or more work stations 102, a distributed version control system (DVCS) 104 or other configuration control system, a continuous integration-continuous deployment (CICD) pipeline tool 106, and a computer system execution environment builder 108 that collaborate together to build and set-up a computer system execution environment 140. In the interest of concision, the computer system execution environment builder 108 may be referred to as the builder 108, and the computer system execution environment 140 may be referred to as the execution environment 140. When a user inputs declarative statements specifying general or abstract characteristics of a desired computing environment into a user interface presented by the work station 102, the work station 102 captures the statements in a file, such as a YAML file format, and provides the file to the DVCS 104. The file is referred to as a manifest file or simply a manifest hereinafter. The DVCS 104 stores the manifest and provides the manifest to the CICD pipeline 106. When the CICD pipeline 106 is triggered (e.g., when software is checked into the DVCS 104), the CICD pipeline 106 sends the manifest and invokes the builder 108 to build or adapt the execution environment 140. The end result is that the builder 108 causes computer hosts and/or servers, load balancers, databases to be configured in the execution environment 140 to provide a computing system infrastructure.

The builder 108 hands back links and references to the work station 102 that enable users to interact with and work on the execution environment 140. In an embodiment, the users access the execution environment 140 using logical names or abstract names that the work stations 102 present to the inventory layer 110, for example to the inventory API 114. In response, the inventory layer 110 looks up the resources in the execution environment 140 that the logical names or abstract names currently refer to (e.g., dereferencing or translating the logical name) and connects the work stations 102 to the referenced resources. In an embodiment, the inventory API 114 maintains a table, a list, or a map from the abstract names or logical names to the actual referenced resources. As the actual referenced resources change, for example as a first resource is decommissioned and a second resource is stood-up to replace the decommissioned first resource, the inventory API 114 changes the mapping of the abstract names or logical names to the subject resources in the execution environment 140. In this way users are relieved of the task of keeping up with changing underlying computer resources. Said in other words, the builder 108 (e.g., the inventory manager 126 and the inventory API 114 collaborating together) handles execution environment migration tasks transparently to users.

In an embodiment, the builder 108 comprises an inventory layer 110, a services/orchestration layer 120, and a pluggable interaction layer 130. In an embodiment, the inventory layer 110 comprises a deploy application programming interface (API) 112 and an inventory API 114. The APIs 112, 114 are applications that execute on one or more computers. In an embodiment, the services/orchestration layer 120 comprises a manifest parser 122, a decision engine 124, and an inventory manager 126. The manifest parser 122, the decision engine 124, and the inventory manager 126 are applications that execute on one or more computers. In an embodiment, the pluggable interaction layer 130 comprises one or more platform-as-a-service (PaaS) pluggable components 132, one or more infrastructure-as-a-service (IaaS) pluggable components 134, one or more database pluggable components 136, one or more load balancer pluggable components 138, and optionally additional pluggable components associated with other portions of a computing system execution environment. In some contexts, the pluggable components may be referred to as pluggable interaction components herein. The pluggable components 132, 134, 136, 138 are applications or software components that execute on one or more computers. Computers and computer systems are discussed further hereinafter.

The work station 102 may present a user interface that facilitates a user inputting declarative statements or selections of what a desired computer system execution environment comprises. For example, the user may stipulate that a database is desired and may stipulate a type of database, for example a relational database, a NoSQL database, a hierarchical database, a columnar database, a wide column database, or another kind of database. A user may provide an indication of database size, for example a maximum number of bytes or a minimum number of bytes. With similar declarative statements or selections (e.g., selection from a list of options) the user may stipulate that load balancing is desired and how many load balancers are desired; the number of server instances or a processing volume desired; that PCI support is desired; that PII handling is desired; that geo-redundancy is desired; and other characteristics of the computer system execution environment 140. The user can state that auto scaling is desired for processing capacity and/or network connections. The user can state that secure sockets layer (SSL) functionality is supported. The user can state that cloud computing resources from a third-party cloud provider be used or that on-premises computing resources be used. The user interface presented by the work station 102 collects the declarative statements and selections input by the user and stores them in the manifest.

The manifest may identify that the execution environment, or a portion of the execution environment, provide persistent storage, optionally identifying a minimum size or volume of such storage. The manifest may identify how many instances of a given application or software artifact are to be launched in the execution environment. The manifest may identify that PCI handling support be provided by at least part of the execution environment (e.g., for all instances of a particular application or software artifact). The manifest may identify a number of availability zones (e.g., data centers with redundant power, networking, and connectivity resources).

The manifest may identify that logging capability be provided for an application or software artifact. The manifest may identify that auto scaling of processing be provided. The manifest can specify the auto scaling criteria as based on CPU status, communication connections status, and others. For example, an auto scaling criteria may stipulate that if average CPU availability is less than 20%, less than 30%, less than 40% or some other value then another instance should be instantiated. The auto scaling may specify a minimum number of computing nodes and/or a maximum number of computing nodes to provide in the execution environment. The manifest may identify that redundancy is desired and how much redundancy is desired. The manifest may identify that georedundancy is desired. The manifest may identify that an application is desired to be deployed or executed on servers located physically near associated databases.

The manifest may identify that a secure sockets layer (SSL) protocol or that a transport layer security (TLS) protocol be used for secure data communication by the execution environment. The manifest may identify a desired number of ingress ports and egress ports of the execution environment. The manifest may identify a desired application language and/or application framework. The manifest can identify a tier of an expected user, for example an administrator tier, an executive tier, a worker tier, an operator tier, or other tier. In an embodiment, the manifest can specify metadata pertaining to the execution environment that identifies the category of the application to be executed in the execution environment.

It is understood that manifests may contain some but not all of these specifications. It is understood that different manifests associated with different applications may have different contents. It is understood that the examples given above of the contents of manifests do not exhaust all the possibilities of contents of manifests.

When the CICD pipeline 106 invokes the builder 108 it does so by calling a method or function or interface of the deploy API 112, providing the manifest at the same time. The deploy API 112 sends the manifest to the manifest parser 122. The manifest parser 122 parses the manifest to determine if it is properly formatted and to assure that it does not contain any errors. If the manifest parser 122 discovers an error that it cannot repair, it sends a message back to the CICD pipeline or other invoking artifact indicating that an error has occurred and optionally providing information about the type of error. If the manifest passes scrutiny, the manifest parser 122 sends the manifest to the decision engine 124.

The decision engine 124 communicates with the inventory manager 126 to learn what computational resources are available. Based on the manifest and based on the available computational resources available, the decision engine 124 determines what computer system execution environment features are most suited to the needs of the user as captured in the manifest. The decision engine 124 may check to see if there are already resources deployed for the desired environment indicated by the manifest. For example, it may be that a development environment has already been deployed. The decision engine 124 can compare already deployed resources to a desired state of the environment and update and/or extend or contract that environment based on the manifest. In an embodiment, the decision engine 124 may reference to a configuration file or to a rules file that guide it in determining the needed execution environment features. This allows the decision engine 124 to be adapted easily as new enterprise computing policies are promulgated and as new computer resource alternatives become available, for example as new third-party database systems are deployed. For example, an enterprise policy may decree that a specific third-party application be used as the result of a business agreement or licensing agreement. By consistently setting-up execution environments with one third-party tool to provide a given computing feature rather than two or more different third-party tools that provide similar capabilities, licensing costs of the enterprise may be reduced. For example, an enterprise policy may decree that a specific third-party application having a better security track record be used instead of two or more different third-party tools that provide similar capabilities, whereby enterprise computing security may be increased.

Based on determining what execution environment features are desired (e.g., based on the manifest), the decision engine 124 may invoke one of the PaaS pluggable components 132 to set-up platform-as-a-service resources, may invoke one of the infrastructure-as-a-service pluggable components 134 to set-up infrastructure-as-a-service resources, may invoke a DB pluggable component 136 to set-up one or more database, may invoke a load balancer pluggable 138 to set-up load balancer support, and may invoke other pluggable components to set-up other computer resources such as PCI handling, PII handling, security, etc.

In invoking these pluggables, the decision engine 124 is exercising intelligence and decision making to map from the execution environment features identified in the manifest to the set-up execution environment that can provide these execution environment features. For example, the decision engine 124 may invoke a pluggable multiple times or may invoke multiple different pluggables to appropriately respond to a manifest stipulating georedundancy. For example, the decision engine 124 may invoke a pluggable multiple times or may invoke multiple different pluggables to appropriately respond to a manifest stipulating clustered databases. Likewise, the decision engine 124 exercises intelligence and decision making to appropriately respond to a manifest stipulating auto scaling, for example by adapting its invocation of pluggables. The decision engine 124 exercises intelligence and decision making in interleaving its invocations of pluggables to establish needed communication linkages among different components or artifacts of the execution environment 140, for example, passing parameters returned by an invocation of a first pluggable as input to an invocation of a second pluggable.

As used herein, a pluggable component is a software executable that is directed to performing a specific set-up for a particular software artifact. There may be different pluggable components for different third-party tools. For example, a first DB pluggable component 136 may be invoked by the decision engine 124 to set-up a NoSQL database and a different second DB pluggable component 136 may be invoked by the decision engine 124 to set-up a relational database. A third pluggable component may be invoked by the decision engine 124 to set-up messaging middleware for an application. A fourth pluggable component may be invoked by the decision engine 124 to set-up PII handling. When invoking the pluggable components, the decision engine 124 may stipulate particular servers or other computer resources that it has learned are available resources from the inventory manager 126. Thus, for the decision engine 124 the computer resources are no longer abstract or generalized computer resources.

The decision engine 124 receives information from the pluggable components about the set-up resources. In some cases, information returned by a first pluggable component related to a first set-up computing resource is passed by the decision engine 124 in invoking a second pluggable component, whereby communication and/or collaboration among resources in the execution environment 140 may be established. The decision engine 124 keeps track of set-up computing resources and communication links among the resources.

The decision engine 124 shares the information of set-up computing resources and communication links among the resources with the inventory manager 126. The inventory manager 126 maintains a record of all computing resources—both those that are allocated to different projects or tasks and those that are idle and/or available for allocation. The inventory manager 126 also keeps track of the communication links among these resources. As computer resource availability changes, for example as servers are decommissioned and other servers are commissioned, the inventory manager 126 automatically maintains the needed execution environment 140 and patches up the communication links among changed resources accordingly. The inventory manager 126 or the decision engine 124 assigns abstract or logical names for execution environment resources that are shared with the users of the workstations 102, and maintains a map of associations of abstract or logical names to actual names or domains of actual execution environment resources.

It is understood that the builder 108 can be used by different users to set-up independent and unrelated computer system execution environments 140. The builder 108 handles each of these interactions independently. For example, the manifest defined by the user via the work station 102 may stipulate such things as a particular project name or application name. Likewise, when users interact with the builder 108 and/or the inventory API 114 to use the execution environment 140, the user may stipulate the project name or the application name, or this may be incorporated into the abstract or logical names provided to the user.

Figure 2A:
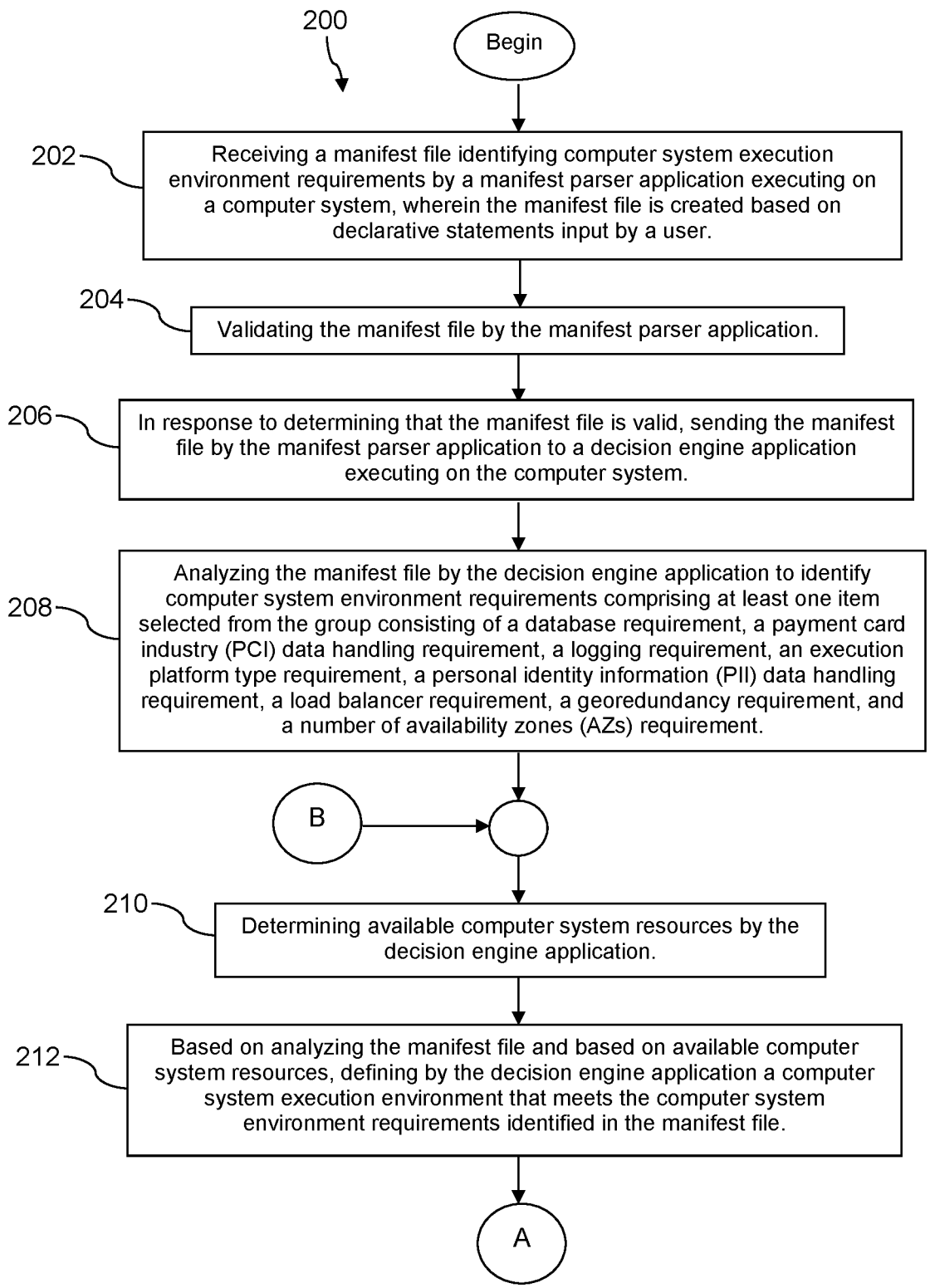
FIG. 2A and FIG. 2B are a flow chart of a method according to an embodiment of the disclosure.
Figure 2B:
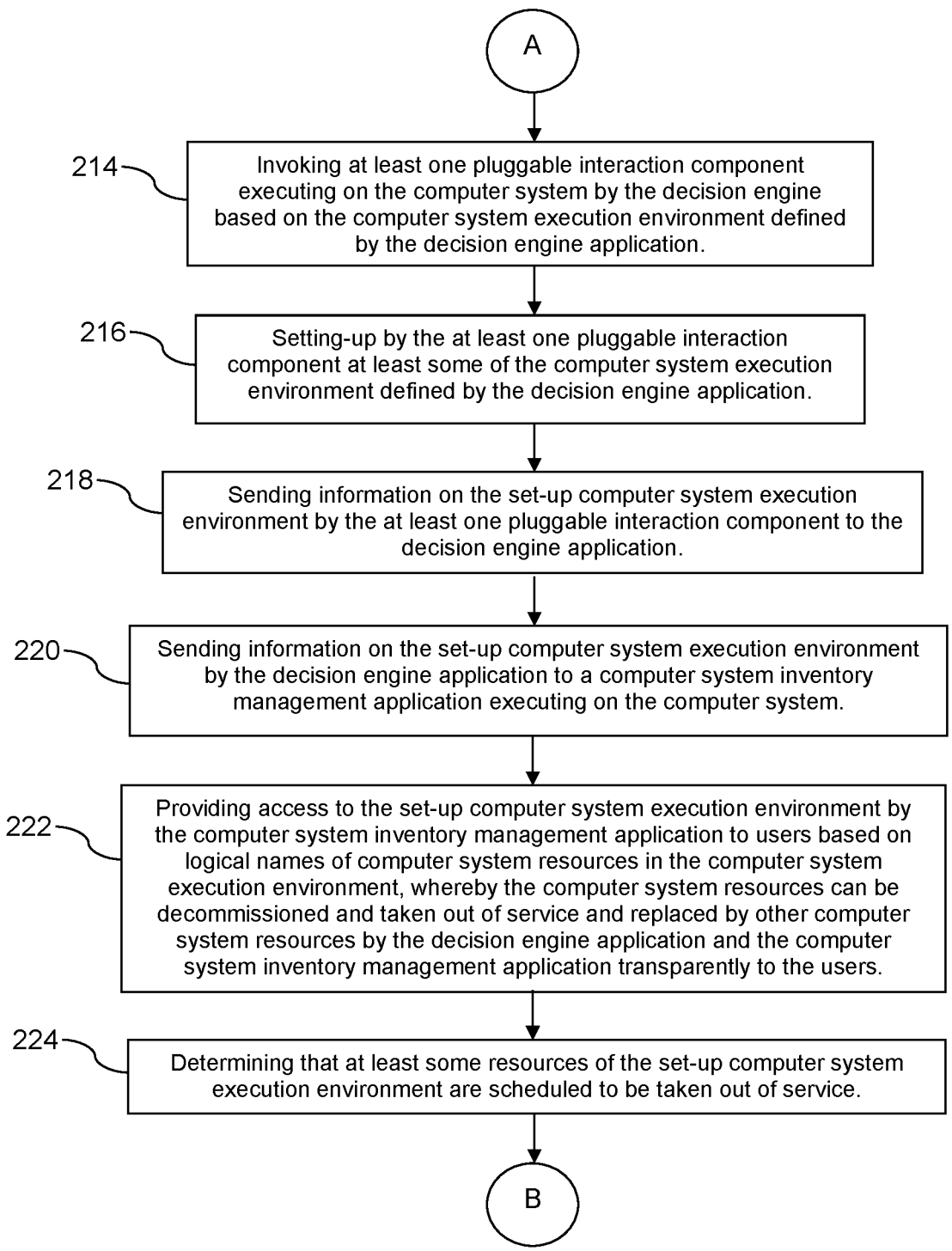

Turning now to FIG. 2A and FIG. 2B, a method 200 is described. In an embodiment, the system 200 is a method of automatically setting up a computer system execution environment based on declarative statements about environment requirements input by a user. At block 202, the method 200 comprises receiving a manifest file identifying computer system execution environment requirements by a manifest parser application executing on a computer system, wherein the manifest file is created based on declarative statements input by a user. It is understood that the computer system may comprise a plurality of computers, hosts, and/or servers that intercommunicate with each other. At block 204, the method 200 comprises validating the manifest file by the manifest parser application. In one circumstance, the manifest file is determined to be valid, and the processing proceeds to block 206. In another circumstance, the manifest file is determined to be invalid, the following blocks are omitted, and the manifest parser application sends a message indicating that the manifest file is invalid, for example sends a message to the CICD pipeline and/or to the work station 102.

At block 206, the method comprises, in response to determining that the manifest file is valid, sending the manifest file by the manifest parser application to a decision engine application executing on the computer system. At block 208, the method 200 comprises analyzing the manifest file by the decision engine application to identify computer system environment requirements comprising at least one item selected from the group consisting of a database requirement, a payment card industry (PCI) data handling requirement, a logging requirement, an execution platform type requirement, a personal identity information (PII) data handling requirement, a load balancer requirement, a georedundancy requirement, and a number of availability zones (AZs) requirement. In an embodiment, the decision engine further analyzes the manifest file to identify computer system environment requirements comprising a persistent storage requirement. In an embodiment, the decision engine further analyzes the manifest file to identify computer system environment requirements comprising a number of availability zones (AZs) requirement. In an embodiment, the execution type requirement identifies a specific application language and/or application framework.

At block 210, the method 200 comprises determining available computer system resources by the decision engine application. At block 212, the method 200 comprises, based on analyzing the manifest file and based on available computer system resources, defining by the decision engine application a computer system execution environment that meets the computer system environment requirements identified in the manifest file. In an embodiment, the decision engine defines the computer system execution environment further based on a rules file. In an embodiment, the rules file defines at least one enterprise policy. This enterprise policy may be a security policy to assure enterprise-wide security of Internet communication. This enterprise policy may be a policy of using a specific application server.

At block 214, the method 200 comprises invoking at least one pluggable interaction component executing on the computer system by the decision engine based on the computer system execution environment defined by the decision engine application. In an embodiment, the at least one pluggable interaction component invoked by the decision engine is selected from the group consisting of a platform-as-a-service pluggable interaction component, an infrastructure-as-a-service pluggable interaction component, a database pluggable interaction component, and a load balancer pluggable interaction component. At block 216, the method 200 comprises setting-up by the at least one pluggable interaction component at least some of the computer system execution environment defined by the decision engine application. In an embodiment, setting-up by the at least one pluggable interaction component at least some of the computer system execution environment comprises setting-up communication links among at least some computer system resources of the computer system execution environment.

At block 218, the method 200 comprises sending information on the set-up computer system execution environment by the at least one pluggable interaction component to the decision engine application. At block 220, the method 200 comprises sending information on the set-up computer system execution environment by the decision engine application to a computer system inventory management application executing on the computer system.

At block 222, the method 200 comprises providing access to the set-up computer system execution environment by the computer system inventory management application to users based on logical names of computer system resources in the execution environment, whereby the computer system resources can be decommissioned and taken out of service and replaced by other computer system resources by the decision engine application and the computer system inventory management application transparently to the users. In an embodiment, the method 200 may further comprise maintaining by the computer system inventory management application a map of logical names of computer system resources in the computer system execution environment to actual names of computer system resources in the computer system execution environment.

In an embodiment, the method 200 may further comprise, at block 224, determining that at least some resources of the set-up computer system execution environment are scheduled to be taken out of service and/or to be decommissioned. In this case, the processing may return to block 210 and the processing of blocks 210, 212, 214, 216, 218, 220, and 222 may be performed again. For example, in this case the method 200 may further comprise, again determining available computer system resources by the decision engine application (e.g., the processing of block 210 repeated when the available computer resources have changed—for example when a first server is decommissioned and replaced by a second new server); defining by the decision engine application a second computer system execution environment that meets the computer system environment requirements identified in the manifest file based on the available computer system resources and excluding the resources scheduled to be taken out of service (e.g., the processing of block 212 repeated with a different understanding by the decision engine of the available computer system resources); invoking at least one pluggable interaction component by the decision engine based on the second computer system execution environment defined by the decision engine application (e.g., the processing of block 214 repeated in the context of the definition of the second computer system execution environment); setting-up by the at least one pluggable interaction component at least some of the second computer system execution environment defined by the decision engine application (e.g., the processing of block 216 repeated in the context of the definition of the second computer system execution environment); sending information on the second set-up computer system execution environment by the at least one pluggable interaction component to the computer system inventory management application (e.g., repeating the processing of blocks 220 and 222 in the context of the second set-up computer system execution environment); and providing access to the second set-up computer system execution environment to users (e.g., repeating the processing of block 222 in the context of the second set-up computer system execution environment). In an embodiment, the repeating of block 216 involves setting-up by the at least one pluggable interaction component at least some of the second computer system execution environment defined by the decision engine application comprises adapting the communication links among the at least some computer system resources of the computer system execution environment. In an embodiment, providing access to the set-up computer system execution environment and providing access to the second set-up computer system execution environment by the computer system inventory management application to users comprises providing logical names for accessing the computer system execution environment and mapping the logical names to actual names of computer system resources and changing the mapping based on the information on the second set-up computer system execution environment by the computer system inventory management application.

In an embodiment, the processing of some or all of the blocks 202-222 may be repeated when an existing environment is already set-up and a user desires to extend this existing environment by adding additional elements that are defined in an updated manifest file. For example, during a first phase of a project the environment may comprise a single web server or application server but in a later (e.g., in production) phase of the project it may be desired that the environment comprise three web servers or application servers. The system would respond to the newly presented manifest file at block 202 and perform the other processing of blocks 204-222. In this iteration, the system would take into account the existing parts of the environment and extend this environment according to the new manifest file. For example, at block 214 the decision engine can determine differences between an existing environment and a desired environment, and then invoke one or more pluggable interaction components to establish additional computer resources not yet part of the deployed environment.

Figure 3:
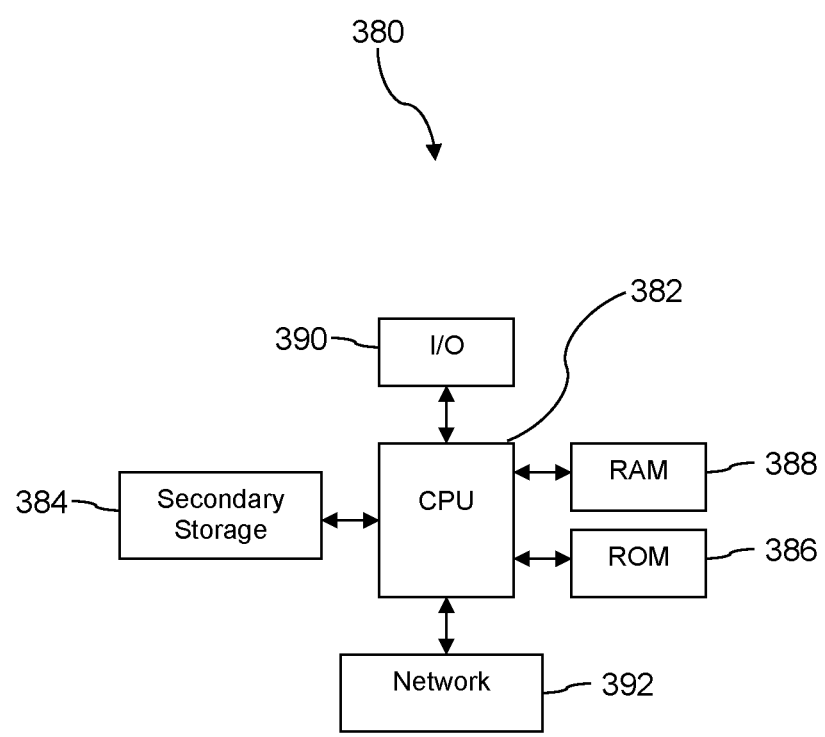
FIG. 3 is a block diagram of a computer system according to an embodiment of the disclosure.

FIG. 3 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of automatically setting up a computer system execution environment based on declarative statements about environment requirements input by a user, comprising:

receiving a manifest file identifying computer system execution environment requirements by a manifest parser application executing on a computer system, wherein the manifest file is created based on declarative statements input by a user;

validating the manifest file by the manifest parser application;

in response to determining that the manifest file is valid, sending the manifest file by the manifest parser application to a decision engine application executing on the computer system;

analyzing the manifest file by the decision engine application to identify computer system environment requirements comprising at least one item selected from the group consisting of a database requirement, a payment card industry (PCI) data handling requirement, a logging requirement, an execution platform type requirement, a personal identity information (PII) data handling requirement, a load balancer requirement, a georedundancy requirement, and a number of availability zones (AZs) requirement;

determining available computer system resources by the decision engine application;

based on analyzing the manifest file and based on the available computer system resources, defining by the decision engine application a computer system execution environment that meets the computer system environment requirements identified in the manifest file;

invoking at least one pluggable interaction component executing on the computer system by the decision engine application based on the computer system execution environment defined by the decision engine application;

setting-up by the at least one pluggable interaction component at least some of the computer system execution environment defined by the decision engine application;

sending information on the set-up computer system execution environment by the at least one pluggable interaction component to the decision engine application;

sending information on the set-up computer system execution environment by the decision engine application to a computer system inventory management application executing on the computer system; and providing access to the set-up computer system execution environment by the computer system inventory management application to users based on logical names of computer system resources in the computer system execution environment, whereby the computer system resources can be decommissioned and taken out of service and replaced by other computer system resources by the decision engine application and the computer system inventory management application transparently to the users.

2. The method of claim 1, further comprising, in response to determining that the manifest file is invalid, sending a message by the manifest parser application indicating that the manifest file is invalid.

3. The method of claim 1, wherein the decision engine application further analyzes the manifest file to identify computer system environment requirements comprising a persistent storage requirement.

4. The method of claim 1, wherein the decision engine application further analyzes the manifest file to identify computer system environment requirements comprising a number of availability zones (AZs) requirement.

5. The method of claim 1, wherein the decision engine application defines the computer system execution environment further based on a rules file.

6. The method of claim 5, wherein the rules file defines at least one enterprise policy.

7. The method of claim 1, further comprising maintaining by the computer system inventory management application a map of logical names of computer system resources in the computer system execution environment to actual names of computer system resources in the computer system execution environment.

8. A method of automatically setting up a computer system execution environment based on declarative statements about environment requirements input by a user, comprising:

receiving a manifest file identifying computer system execution environment requirements by a manifest parser application executing on a computer system, wherein the manifest file is created based on declarative statements input by a user;

analyzing the manifest file by a decision engine application executing on the computer system to identify computer system environment requirements comprising at least one item selected from the group consisting of a database requirement, a payment card industry (PCI) data handling requirement, a logging requirement, an execution platform type requirement, a personal identity information (PII) data handling requirement, a load balancer requirement, a georedundancy requirement, and a number of availability zones (AZs) requirement;

defining by the decision engine application a computer system execution environment that meets the computer system environment requirements identified in the manifest file;

invoking at least one pluggable interaction component executing on the computer system by the decision engine application based on the computer system execution environment defined by the decision engine application;

setting-up by the at least one pluggable interaction component at least some of the computer system execution environment defined by the decision engine application;

sending information on the set-up computer system execution environment by the at least one pluggable interaction component to a computer system inventory management application executing on the computer system;

providing access to the set-up computer system execution environment by the computer system inventory management application to users;

determining that at least some resources of the set-up computer system execution environment are scheduled to be taken out of service;

determining available computer system resources by the decision engine application;

defining by the decision engine application a second computer system execution environment that meet the computer system environment requirements identified in the manifest file based on the available computer system resources and excluding the resources scheduled to be taken out of service;

invoking at least one pluggable interaction component executing on the computer system by the decision engine application based on the second computer system execution environment defined by the decision engine application;

setting-up by the at least one pluggable interaction component at least some of the second computer system execution environment defined by the decision engine application;

sending information on the second set-up computer system execution environment by the at least one pluggable interaction component to the computer system inventory management application; and providing access to the second set-up computer system execution environment by the computer system inventory management application to users.

9. The method of claim 8, wherein setting-up by the at least one pluggable interaction component at least some of the computer system execution environment comprises setting-up communication links among at least some computer system resources of the computer system execution environment.

10. The method of claim 9, wherein setting-up by the at least one pluggable interaction component at least some of the second computer system execution environment defined by the decision engine application comprises adapting the communication links among the at least some computer system resources of the computer system execution environment.

11. The method of claim 8, wherein providing access to the set-up computer system execution environment and providing access to the second set-up computer system execution environment by the computer system inventory management application to users comprises providing logical names for accessing the computer system execution environment and mapping the logical names to actual names of computer system resources and changing the mapping based on the information on the second set-up computer system execution environment by the computer system inventory management application.

12. The method of claim 8, wherein the execution type requirement identifies a specific application framework.

13. The method of claim 8, wherein the at least one pluggable interaction component invoked by the decision engine application is selected from the group consisting of a platform-as-a-service pluggable interaction component, an infrastructure-as-a-service pluggable interaction component, a database pluggable interaction component, and a load balancer pluggable interaction component.

14. A system for setting up computer system execution environments based on declarative statements about environment requirements input by a user, comprising:

an at least one processor;

a non-transitory memory; and a manifest parser application stored in the non-transitory memory that, when executed by the at least one processor, receives an environment manifest comprising declarative statements about computer system execution environment requirements and validates the environment manifest;

a decision engine application stored in the non-transitory memory that, when executed by the at least one processor:

analyzes the environment manifest to determine what environment capabilities are identified, determines available computer system resources, based on the analysis of the environment manifest and on the determination of available computer system resources, defines a computer system execution environment that meets the requirements identified in the manifest and can be supported by the available computer system resources, and invokes one or more pluggable interaction components to set-up the defined computer system execution environment; and a plurality of pluggable interaction components stored in the non-transitory memory that, when executed by the at least one processor, act upon requests from the decision engine application to build the computer system execution environment, whereby users are able to set-up the computer system execution environment without defining low level details of the computer system execution environment.

15. The system of claim 14, wherein if the manifest parser determines that the environment manifest contains an error, the manifest parser sends a message identifying the error.

16. The system of claim 14, wherein the environment manifest identifies a requirement that the computer system execution environment provide persistent storage.

17. The system of claim 14, wherein the environment manifest identifies a requirement that the computer system execution environment provide payment card industry (PCI) handling support.

18. The system of claim 14, wherein the environment manifest identifies a requirement that the computer system execution environment provide a specific application framework.

19. The system of claim 14, wherein the decision engine application invokes the one or more pluggable interaction components partly to set-up communication linkages between different components of the computer system execution environment.

20. The system of claim 14, wherein the plurality of pluggable interaction components comprise at least one platform-as-a-service pluggable interaction component, at least one infrastructure-as-a-service pluggable interaction component, at least one database pluggable interaction component, and at least one load balancer pluggable interaction component.

* * * * *